(12) United States Patent
Tuttle

(10) Patent No.: US 7,859,416 B2
(45) Date of Patent: Dec. 28, 2010

(54) METHOD AND SYSTEM OF ATTACHING A RFID TAG TO AN OBJECT

(75) Inventor: John R Tuttle, Boulder, CO (US)

(73) Assignee: Round Rock Research, LLC, Mount Kisco, NY (US)

( * ) Notice: Subject to any disclaimer, the term of this patent is extended or adjusted under 35 U.S.C. 154(b) by 244 days.

(21) Appl. No.: 11/766,365

(22) Filed: Jun. 21, 2007

(65) Prior Publication Data

US 2008/0316035 A1    Dec. 25, 2008

(51) Int. Cl.
*G08B 13/14* (2006.01)
*G06K 19/06* (2006.01)

(52) U.S. Cl. ................................ 340/572.8; 235/492
(58) Field of Classification Search ... 340/572.1–572.8; 235/482.02, 492; 343/906
See application file for complete search history.

(56) References Cited

U.S. PATENT DOCUMENTS

| | | | | |
|---|---|---|---|---|
| 3,662,434 | A | * | 5/1972 | Clayton .................. 24/30.5 P |
| 3,913,179 | A | * | 10/1975 | Rhee ....................... 24/16 PB |
| 5,406,263 | A | | 4/1995 | Tuttle |
| 5,914,671 | A | | 6/1999 | Tuttle |
| 6,097,301 | A | | 8/2000 | Tuttle |
| 6,127,917 | A | | 10/2000 | Tuttle |
| 6,144,301 | A | * | 11/2000 | Frieden .................... 340/572.8 |
| 6,222,452 | B1 | * | 4/2001 | Ahlstrom et al. ......... 340/572.1 |
| 6,239,737 | B1 | | 5/2001 | Black |
| 6,283,065 | B1 | | 9/2001 | Shorrock et al. |
| 6,509,829 | B1 | | 1/2003 | Tuttle |
| 6,618,024 | B1 | | 9/2003 | Adair et al. |
| 6,624,752 | B2 | | 9/2003 | Klitsgaard et al. |
| 6,698,653 | B1 | | 3/2004 | Diamond et al. |
| 6,703,935 | B1 | | 3/2004 | Chung et al. |
| 6,724,309 | B2 | | 4/2004 | Grose et al. |
| 6,747,562 | B2 | | 6/2004 | Giraldin et al. |
| 6,842,121 | B1 | | 1/2005 | Tuttle |
| 6,867,983 | B2 | | 3/2005 | Liu et al. |
| 6,888,502 | B2 | | 5/2005 | Beigel et al. |
| 6,991,175 | B1 | * | 1/2006 | Huang ........................ 235/492 |
| 6,992,952 | B2 | | 1/2006 | Endo et al. |
| 7,015,817 | B2 | | 3/2006 | Copley et al. |
| 7,034,683 | B2 | | 4/2006 | Ghazarian |
| 7,042,360 | B2 | | 5/2006 | Light et al. |
| 7,198,174 | B2 | * | 4/2007 | Sloan .......................... 221/33 |
| 7,204,652 | B2 | * | 4/2007 | Warther ....................... 400/76 |
| 7,212,127 | B2 | * | 5/2007 | Jacober et .............. 340/572.8 |
| 7,479,882 | B2 | * | 1/2009 | Mahaffey ............... 340/572.3 |
| 7,479,888 | B2 | * | 1/2009 | Jacober et al. ........... 340/572.8 |
| 2006/0109133 | A1 | | 5/2006 | Grose et al. |

OTHER PUBLICATIONS

Jonathan Collins, A Cheaper Way to Convert Labels, RFID Journal, Oct. 13, 2004; 2pp.
RFID—FAQ's RFID—Technological Transformation http://www.morkandy.com/rfid/rtidfaq.cfm.
Valeron Strength Films Advertisement—http://ernea.valeron.com/index.php?ch=med.
Worldlabel.com Advertisement—Xtrack RFID Smart Labels from Worldlabel.com printed on Blank RFID labels: http://www.worldlabel.com/rfid/rfid.htm.

* cited by examiner

*Primary Examiner*—Benjamin C Lee
*Assistant Examiner*—Sigmund Tang
(74) *Attorney, Agent, or Firm*—Lerner, David, Littenberg, Krumholz & Mentlik, LLP

(57) ABSTRACT

Methods and systems of attaching a RFID tag to an object. At least some of the illustrative embodiments are systems comprising a substrate having a pendant portion and an attachment portion, a radio frequency identification (RFID) circuit disposed on the substrate, and a tag antenna coupled to the RFID circuit and disposed on the substrate. The attachment portion of the substrate is configured to couple to an object and the pendant portion is configured to extend away from the object.

6 Claims, 5 Drawing Sheets

METHOD AND SYSTEM OF ATTACHING A RFID TAG TO AN OBJECT

BACKGROUND

1. Field

This disclosure is directed to radio frequency identification (RFID) tags and coupling the RFID tags to objects.

2. Description of the Related Art

Radio frequency identification (RFID) tags comprise a RFID circuit and a tag antenna coupled to the RFID circuit. In some cases, the RFID circuit and tag antenna are placed on a flexible substrate, and the combined RFID circuit, tag antenna and substrate are referred to as an inlay. The size of the tag antenna, and thus the size of RFID tag, is related to the frequency of operation of the RFID tag. For example, a RFID tag operating within a range of frequencies from 860 to 960 Mega-Hertz (MHz) has an antenna length of approximately four inches. In the related art, inlays comprising RFID circuits and tag antennas are laminated within an adhesive label having a length and width of sufficient size to accommodate the RFID tag (e.g., four inches by four inches, or four inches by eight inches), and the label is wholly adhered to an underlying object.

However, many objects to which attaching a RFID may be beneficial are not of sufficient size to accommodate a specific RFID tag. For example, seedling nursery plants and small poultry may be too small to accommodate a RFID tag spanning four inches or more. Moreover, antennas do not work well when placed proximate to metallic or water-based objects, and thus even if a location of sufficient size can be found to which to adhere a label having an RFID tag, RFID tag performance may be severely degraded. Further still, while an object may be of sufficient size to accommodate an RFID tag, adhering a label with a laminated RFID tag to the object may not be desirable (e.g., airline customers may not appreciate a large label semi-permanently adhered to their luggage).

BRIEF DESCRIPTION OF THE DRAWINGS

For a detailed description of various embodiments, reference will now be made to the accompanying drawings in which.

NOTATION AND NOMENCLATURE

Certain terms are used throughout the following description and claims to refer to particular system components. As one skilled in the art will appreciate, design and manufacturing companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components.

DETAILED DESCRIPTION OF DISCLOSED EMBODIMENTS

Figure 1:
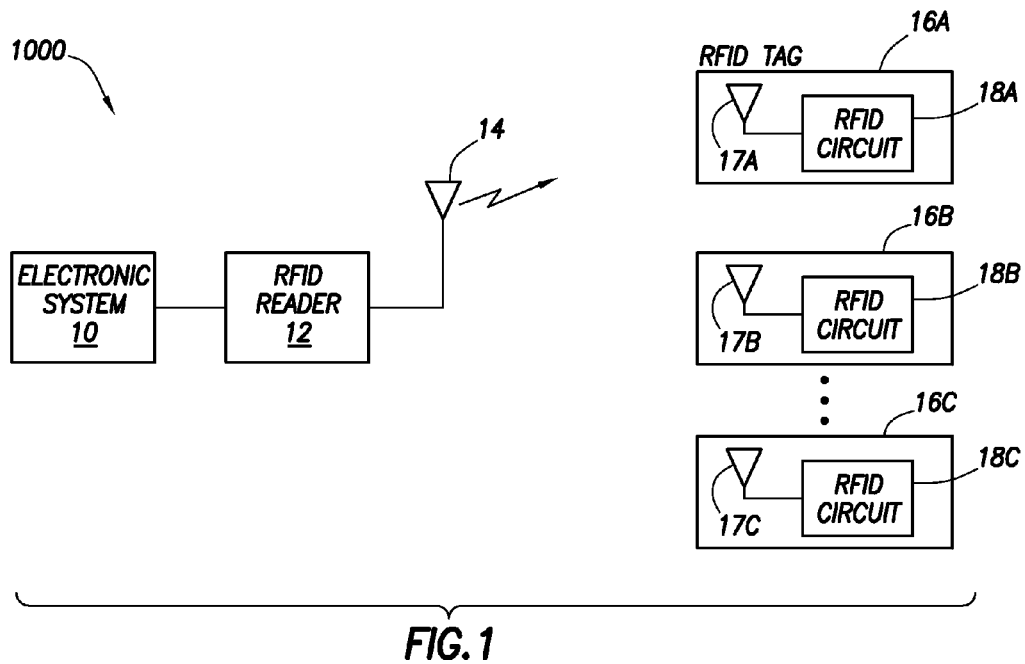
FIG. 1 shows a radio frequency identification (RFID) system in accordance with at least some embodiments.

FIG. 1 illustrates a system 1000 in accordance with at least some embodiments. In particular, system 1000 comprises an electronic system 10 (e.g., a computer system) coupled to a radio frequency identification (RFID) reader 12. The RFID reader 12 may be equivalently referred as an interrogator. By way of antenna 14, the RFID reader 12 communicates with one or more RFID tags 16A-16C proximate to the RFID reader (i.e., within communication range).

Considering a single RFID tag 16A (but the description equally applicable to all the RFID tags 16), the communication sent by the RFID reader 12 is received by tag antenna 17A, and passed to the RFID circuit 18A. If the communication from the RFID reader triggers a response, the RFID circuit 18 sends to the RFID reader 12 the response (e.g., a tag identification value, or data held in the tag memory) using the tag antenna 17A. The RFID reader 12 passes data obtained from the various RFID tags 16 to the electronic system 10, which performs any suitable function. For example, the electronic system 10, based on the data received from the RFID tags 16, may allow access to a building or parking garage, note the entrance of an employee to a work location, direct a parcel identified by the RFID tag 16 down a particular conveyor system, or track the movement of poultry.

There are several types of RFID tags operable in the illustrative system 1000. For example, RFID tags may be active tags, meaning each RFID tag comprises its own internal battery or other power source. Using power from the internal power source, an active RFID tag monitors for signals from the RFID reader 12. When an interrogating signal directed to the RFID tag is sensed, the tag response may be tag-radiated radio frequency (RF) power (with a carrier modulated to represent the data or identification value) using power from the internal battery or power source.

A second type of RFID tag is a semi-active tag. A semi-active tags has an internal battery or power source, but a semi-active tag remains dormant (i.e., powered-off or in a low power state) most of the time. When an antenna of a semi-active tag receives an interrogating signal, the power received is used to wake or activate the semi-active tag, and a response (if any) comprising an identification value is sent by modulating the RF backscatter from the tag antenna, with the semi-active tag using power for internal operations from its internal battery or power source. In particular, the RFID reader 12 and antenna 14 continue to transmit power after the RFID tag is awake. While the RFID reader 12 transmits, the tag antenna 17 of the RFID tag 16 is selectively tuned and de-tuned with respect to the carrier frequency. When tuned, significant incident power is absorbed by the tag antenna 17. When de-tuned, significant power is reflected by the tag antenna 17 to the antenna 14 of the RFID reader 12. The data or identification value modulates the carrier to form the reflected or backscattered electromagnetic wave. The RFID reader 12 reads the data or identification value from the backscattered electromagnetic waves. Thus, in this specification and in the claims, the terms "transmitting" and "transmission" include not only sending from an antenna using internally sourced power, but also sending in the form of backscattered signals.

A third type of RFID tag is a passive tag, which, unlike active and semi-active RFID tags, has no internal battery or power source. The tag antenna 17 of the passive RFID tag receives an interrogating signal from the RFID reader, and the power extracted from the received interrogating signal is used to power the tag. Once powered or "awake," the passive RFID tag may accept a command, send a response comprising a data or identification value, or both; however, like the semi-active tag the passive tag sends the response in the form of RF backscatter.

Figure 2:
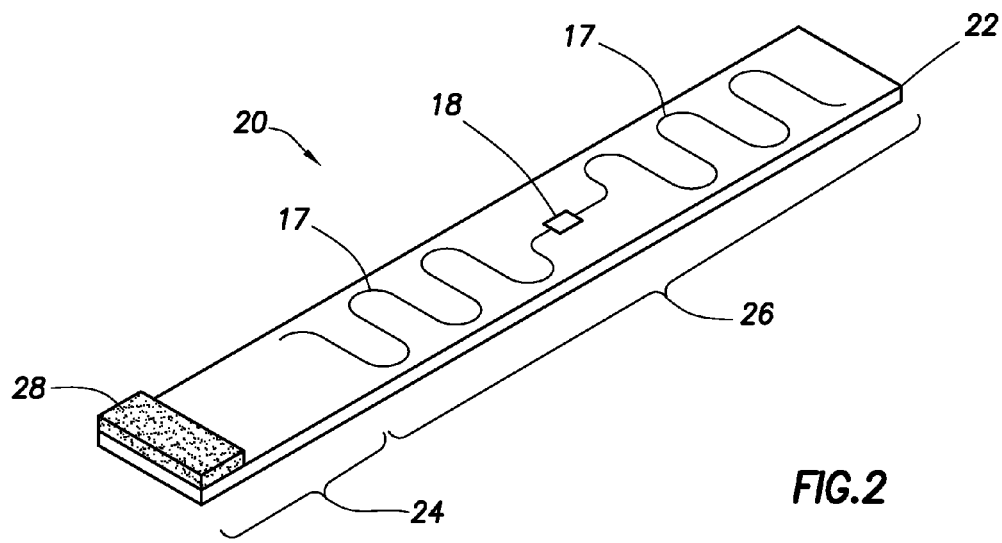
FIG. 2 shows an RFID tag in accordance with some embodiments.

FIG. 2 shows a perspective view of a RFID tag 20 in accordance with at least some embodiments. In particular, the RFID tag 20 comprises a flexible substrate 22 upon which a RFID circuit 18 and tag antenna 17 are located. In some embodiments, the flexible substrate is a thin film of plastic (e.g., polyester) suitable for being rolled around a spool and then fed from the spool during manufacture and/or attachment of the RFID tag 20. However, any flexible non-conductive material may be equivalently used. In some embodiments, the RFID circuit 18 and tag antenna 17 may be manufactured directly on substrate 22, and in other embodiments the RFID circuit 18 and tag antenna 20 may be manufactured on a separate inlay, and the inlay coupled to the substrate 22.

The substrate 22 is logically (though not necessarily physically) divided into two portions: an attachment portion 24; and a pendant portion 26. As the name implies, the attachment portion 24 is the portion of the substrate 22 used to couple the RFID tag to an object. The pendant portion 26, comprising the RFID circuit 18 and tag antenna 17, is configured to extend away from the underlying object, as held by the attachment portion 24. Stated otherwise, the pendant portion 26 is suspended by the attachment portion 24 such that the pendant portion extends away from the underlying object. In the illustrative embodiments of FIG. 2, the attachment portion 24 comprises an adhesive 28 that at least partially covers the attachment portion 24. The adhesive may be a liquid adhesive applied to the attachment portion, or the adhesive may comprise a flexible substrate (e.g., plastic, foam) having adhesive applied to both sides thereof (e.g., double-sided tape). In some embodiments, the adhesive is used for substantially permanent adhesion, and in other embodiments the adhesive may enable adhesion, disconnection and re-adhesion.

Figure 3:
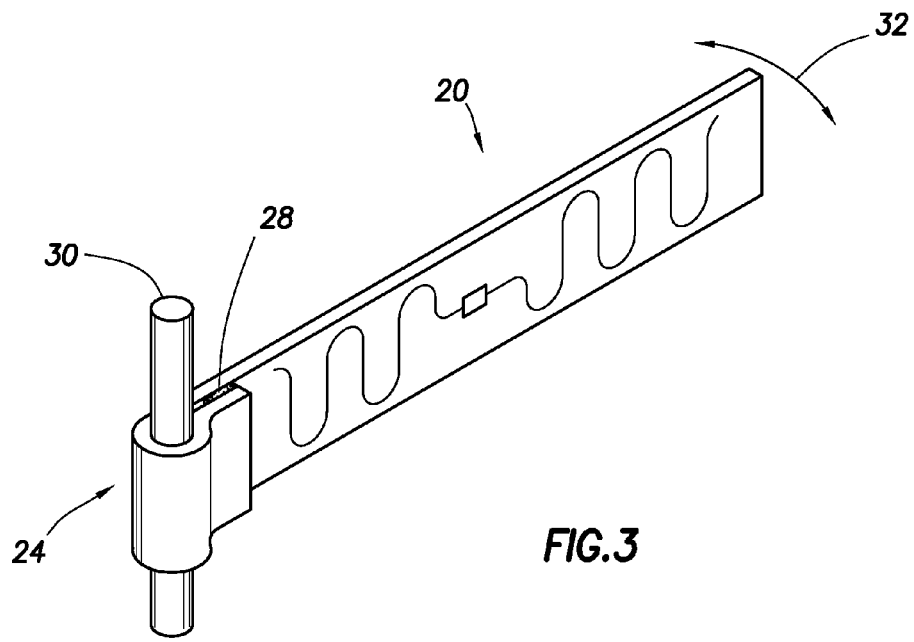
FIG. 3 shows coupling the RFID tag of FIG. 2 to an object.

FIG. 3 illustrates the RFID tag 20 of FIG. 2 attached to an object 30, which RFID tag 20 may be an inlay or a preassembled type. In particular, the attachment portion 24 wraps around the object 30 (i.e., circumscribes at least a portion of the object). In the illustrative embodiments of the FIG. 3, the distal end of the attachment portion 24 couples to the RFID tag 20 by way of the adhesive 28. In particular, the attachment portion 24 may wrap around and couple to itself, or wrap around and couple to the pendant portion 26. In the illustrative embodiments of FIG. 3, the RFID 20 is free to rotate about the object, as illustrated by line 32. The object 30 may take many forms. For example, the object may be the leg of an animal (e.g., a chicken or turkey), a stem or trunk of a plant (e.g., small tree, bush or seedling plant), or the handle of a piece of luggage.

Figure 4:
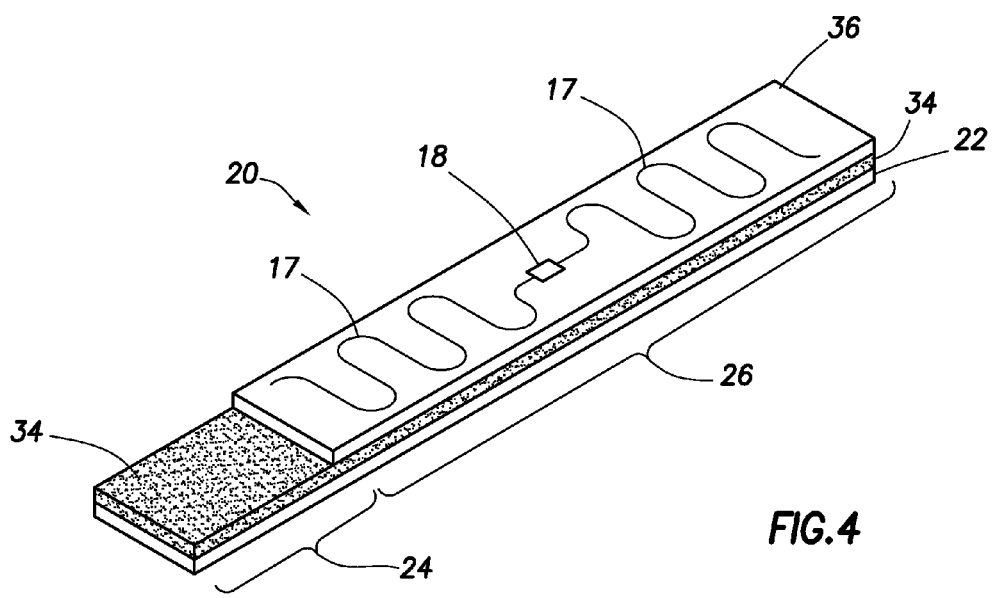
FIG. 4 shows an RFID tag in accordance with some embodiments.

FIG. 4 illustrates other embodiments of the RFID tag 20. In particular, FIG. 4 shows RFID tag 20 comprising substrate 22. An adhesive layer 34 covers one side of the substrate 22. The portion of the adhesive layer 34 within the attachment portion 24 is exposed, while the portion of the adhesive layer 34 within the pendant portion 26 is covered with an inlay 36 comprising the RFID circuit 18 and tag antenna 17. Although inlay 36 is shown with the RFID circuit 18 and tag antenna 17 exposed on the upper surface, in alternative embodiments the RFID circuit 18 and tag antenna 17 may be disposed between the inlay 36 and the adhesive 34. Thus, FIG. 4 illustrates that the RFID circuit 18 and tag antenna 17 may be manufactured on or attached to a separate inlay 36 and coupled to the substrate 22. Moreover, FIG. 4 illustrates that the attachment portion 24 need not have just a small portion having an adhesive (as in FIG. 2), and thus that the adhesive may span the entire attachment portion 24. It is noted, however, that in embodiments where the adhesive spans the entire attachment portion 24, the adhesive need not span the entire substrate 22. In fact, in embodiments where the RFID circuit 18 and tag antenna 17 are coupled directly to the substrate 22, or manufactured directly on the substrate 22, the adhesive may be present only in the attachment portion 24.

Figure 5:
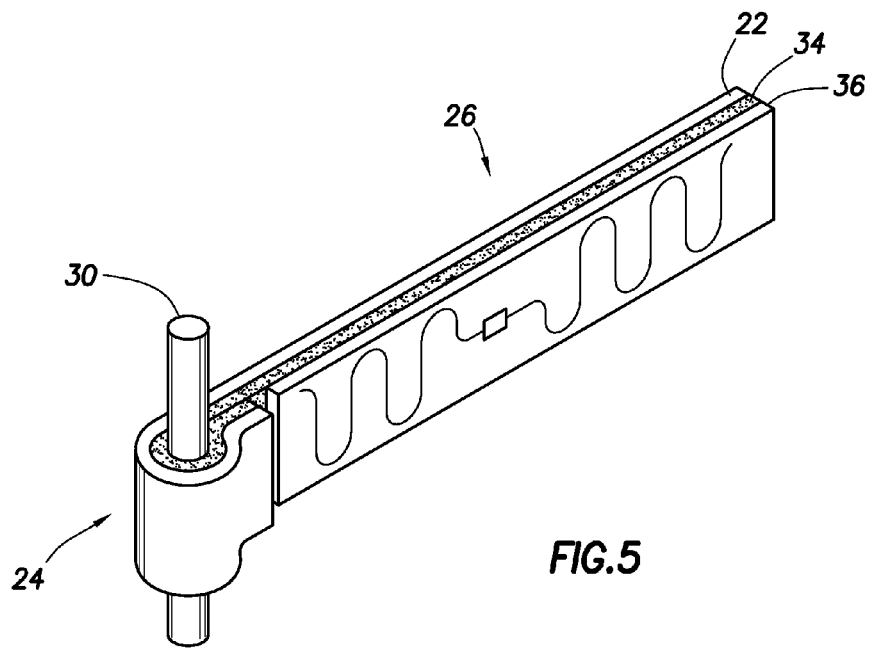
FIG. 5 shows coupling the RFID tag of FIG. 4 to an object.

FIG. 5 illustrates embodiments of attaching the RFID tag 20 of FIG. 4 to an object 30. In particular, the attachment portion 24 wraps around the object 30. In the illustrative embodiments of the FIG. 5, not only does the distal end of the attachment portion 24 couple to the RFID tag 20 by way of the adhesive 34, but the adhesive 34 also adheres at least partially to the object 30. The attachment portion 24 may wrap around and couple to itself, or may wrap around and couple to the pendant portion 26. Unlike the embodiments of FIG. 3, the RFID 20 of FIG. 5 is not free to rotate about the object 30, although the flexibility of the substrate 22, adhesive 34 and inlay 36 may allow displacement of the pendant portion 26.

Figure 6:
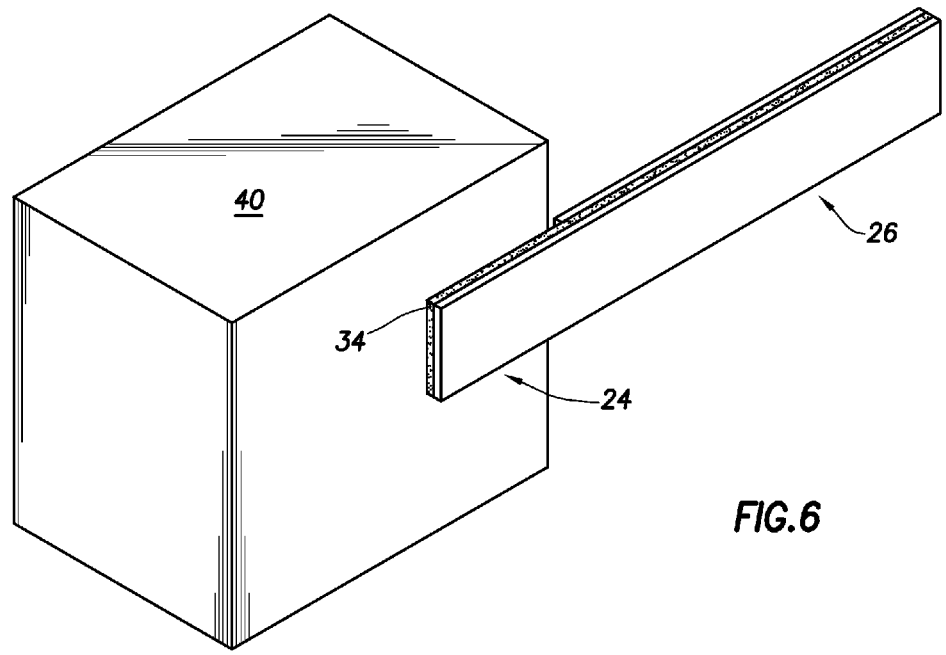
FIG. 6 shows coupling the RFID tag of FIG. 5 to an object in accordance with other embodiments.

FIG. 6 illustrates other embodiments of attaching RFID tag 20 of FIG. 4 to an object. In particular, the attachment portion 24 couples to the object 40 by way of the adhesive 34. Thus, in these embodiments the attachment portion does not wrap around (as in FIGS. 3 and 5), but conforms to the shape of the underlying object 40. Here again, the pendant portion 26 is suspended and/or held away from the object 40 by the attachment portion 24.

Figure 7:
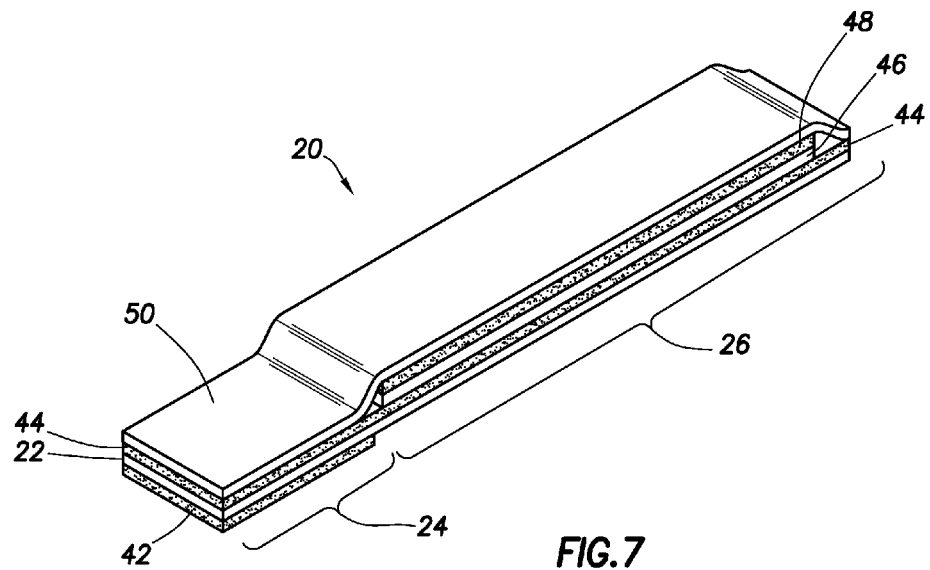
FIG. 7 shows an RFID tag in accordance with some embodiments.

FIG. 7 illustrates yet still further embodiments of RFID tags where the RFID circuit and tag antenna are held within a laminate structure. In particular, RFID tag 20 of FIG. 7 comprises the substrate 22. Within the attachment portion 24 an adhesive 42 is applied to the bottom of the substrate 22. Another adhesive layer 44 is coupled to the top of the substrate 22. Within the pendant portion 26, an inlay 46 comprising the RFID circuit and tag antenna (not visible) couples to the adhesive layer 44. Yet another adhesive layer 48 couples to the inlay 46, and film material 50 couples to the adhesive layer 44 within the attachment portion); the adhesive layer 48 over the inlay 46; and a small portion of the adhesive layer 44 at the end opposite the attachment portion 24. The RFID tag 20 of FIG. 7 may be useful to protect the RFID circuit and antenna in situations such as adverse weather conditions or excessive mechanical stresses (e.g., luggage handling operations). The illustrative embodiments of FIG. 7 may be coupled to the underlying object in many ways (e.g., FIGS. 3, 5 and 6).

Figure 8:
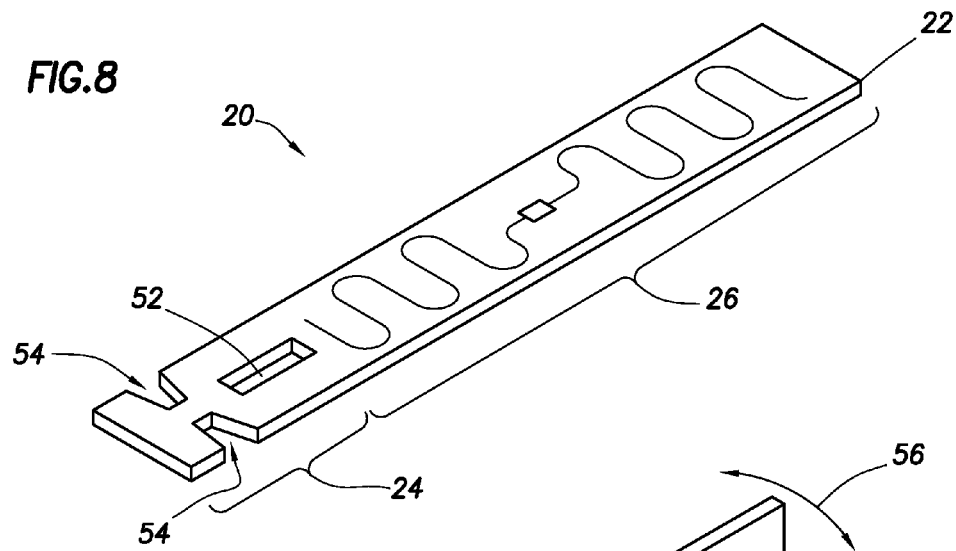
FIG. 8 shows an RFID tag in accordance with some embodiments.

The various embodiments discussed to this point have used an adhesive in the attachment portion 24 as the fastening system to couple the RFID tag to the underlying object; however, other fastening systems in the attachment portion may be used to couple the RFID tag to the underlying object. FIG. 8 illustrates embodiments where the fastening system of the attachment portion comprises an aperture and notch arrangement. In particular, the RFID tag 20 of FIG. 8 comprises a flexible substrate 22 upon which a RFID circuit 18 and tag antenna 17 are located. As above, the RFID circuit 18 and tag antenna 17 may be manufactured directly on substrate, or manufactured on a separate inlay and the inlay coupled to the substrate 22. In other embodiments, the RFID circuit and tag antenna couple to the substrate 22 in any suitable fashion (e.g., FIG. 4 or FIG. 7). The attachment portion 24 comprises an aperture 52 and corresponding notches 54. The aperture 52 and notches 54 work together to couple the RFID tag 20 to an underlying object.

Figure 9:
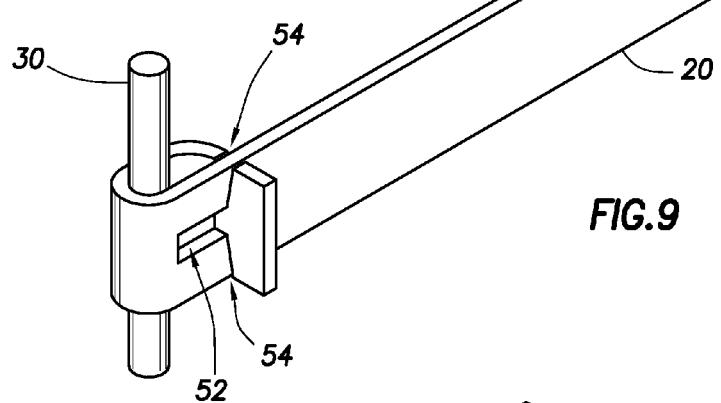
FIG. 9 shows coupling the RFID tag of FIG. 8 to an object.

FIG. 9 illustrates the RFID tag 20 of FIG. 8 attached to an object 30. In particular, the attachment portion 24 wraps around the object 30 (i.e., circumscribes at least a portion of the object). In the illustrative embodiments of the FIG. 9, the distal end of the attachment portion 24, comprising the notches 54, is inserted through the aperture 52. The notches then couple to the aperture so as not to be easily pulled back through the aperture 52. In the illustrative embodiments of FIG. 9, the RFID 20 is free to rotate about the object, as illustrated by line 56.

Figure 10A:
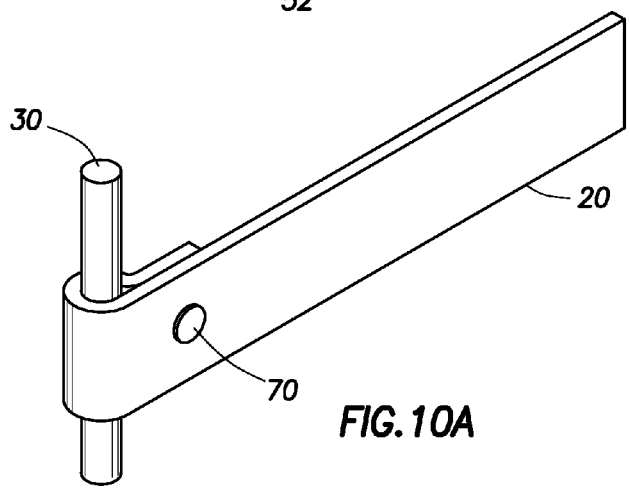
FIG. 10A shows an RFID tag in accordance with some embodiments.
Figure 10B:
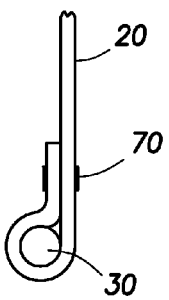
FIG. 10B shows coupling the RFID tag of FIG. 10A to an object.

FIG. 10 (comprising FIGS. 10A and 10B) illustrates yet still other fastening systems. In particular, FIG. 10 illustrates an RFID tag 20 coupled to an object 30 by way of a fastening system being a snap 70. The snap 70 may permanently snap together, or may allow selective coupling and de-coupling. Other physical mechanism may be used as the fastening system, such as: a staple that staples the attachment portion to itself or the pendant portion; a rivet that affixes the attachment portion to itself or the pendant portion; coupling the attachment portion to itself or the pendant portion by way of a grommet in one or both the attachment and pendant portions; tying the attachment portion to itself or the pendant portion by a string; and tying the attachment portion to itself or the pendant portion by way of a cable-tie.

Figure 11:
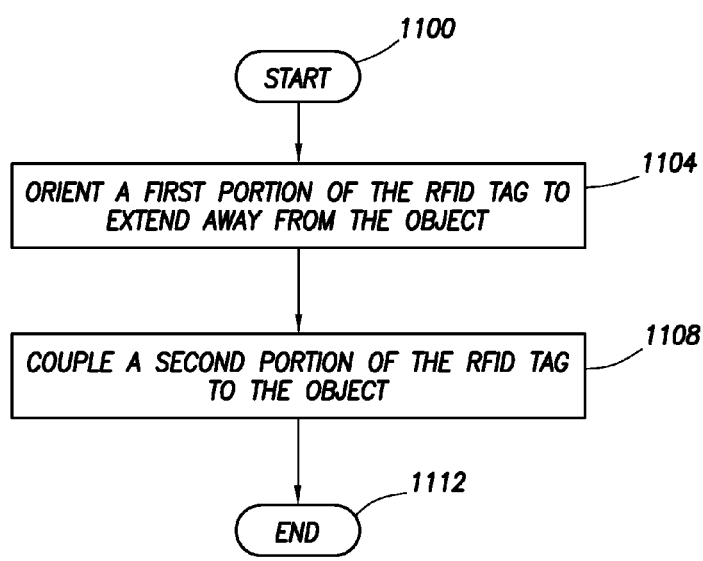
FIG. 11 shows a method in accordance with some embodiments.

FIG. 11 illustrates a method of affixing an RFID tag to an object in accordance with at least some embodiments. In particular, the method starts (block 1100) and proceeds to orienting a first portion of the RFID tag to extend away from the object (block 1104). In extending away, the first portion need not extend away perpendicularly from the object, and indeed the first portion may extend away at any acute or obtuse angle. Regardless of the precise orientation of the first portion, a second portion of the RFID tag is coupled to the object (block 1108), and the illustrative method ends (block 1112). Coupling the second portion to the object may take many forms. In some embodiments, the second portion comprises an adhesive. The second portion is wrapped around an object, and the adhesive couples to the RFID tag, the object, or both. In other embodiments, the second portion is wrapped around the object, and the second portion couples to itself (e.g., by an aperture and slot arrangement). In yet still other embodiments, the second portion couples to the object without wrapping (e.g., FIG. 6). In still further embodiments, the second portion couples to itself or the second portion by way of a snap, staple, rivet, grommet, string or cable-tie.

The above discussion is meant to be illustrative of the principles and various embodiments of the present invention.

Numerous variations and modifications will become apparent to those skilled in the art once the above disclosure is fully appreciated. For example, while the pendant portion has been described as flexible, the pendant portion need not be flexible, with only the attachment portion being flexible. Moreover, while the embodiments using the aperture and tabs as the mechanism to couple the RFID tag to the object show the aperture proximate to the RFID circuit and tag antenna, and the notches on a distal end of the attachment portion, the placement may be equivalently reversed with the aperture proximate to the distal end of the attachment portion and the notches proximate to the RFID circuit and tag antenna. Further still, while both the RFID circuit and tag antenna are shown on the pendant portion, the RFID circuit and some or all of the tag antenna may likewise reside on the attachment portion. It is intended that the following claims be interpreted to embrace all such variations and modifications.

What is claimed is:

1. A system comprising:
    a substrate comprising a pendant portion and an attachment portion;
    a first adhesive layer formed over a first surface of the substrate in the attachment portion;
    a second adhesive layer formed over a second surface of the substrate in the pendant portion and in the attachment portion;
    an inlay formed on the second adhesive layer and over the pendant portion of the substrate, the inlay comprising a radio frequency identification (RFID) circuit and a tag antenna coupled to the RFID circuit, wherein an end of the second adhesive layer formed in the pendant portion is exposed by the inlay;
    a third adhesive layer formed over the inlay; and
    a film formed over the pendant portion and over the attachment portion of the substrate, wherein:
        in the pendant portion, the film is formed on the third adhesive layer and on the exposed end of the second adhesive layer, and
        in the attachment portion, the film is formed on the second adhesive layer,
    wherein the first adhesive layer is configured to adhere to an object and fixedly secure the attachment portion of the substrate to the object, and the pendant portion of the substrate is configured to extend away from the object.

2. The system according to claim 1 wherein the RFID circuit and tag antenna are disposed on the inlay over the pendant portion of the substrate.

3. The system according to claim 1 wherein the first adhesive is configured to wrap around a portion of the object and to one or more selected from the group consisting of:
    the attachment portion of the substrate and the pendant portion of the substrate.

4. The system according to claim 1 wherein the attachment portion further comprises a fastening system, and wherein the fastening system is configured to couple the attachment portion to the object.

5. The system according to claim 4 wherein the fastening system comprises: an aperture; and a notch; wherein the notch is configured to couple to the aperture to couple the attachment portion to the object.

6. The system according to claim 4 wherein the fastening system comprises one or more selected from the group consisting of: snap; staple; rivet; grommet; string; and cable-tie.

* * * * *